J. A. DE BOUZEK.
AUTOMATIC FOCUSING DEVICE FOR CAMERAS.
APPLICATION FILED APR. 26, 1918.
1,387,457.
Patented Aug. 16, 1921.
3 SHEETS—SHEET 2.
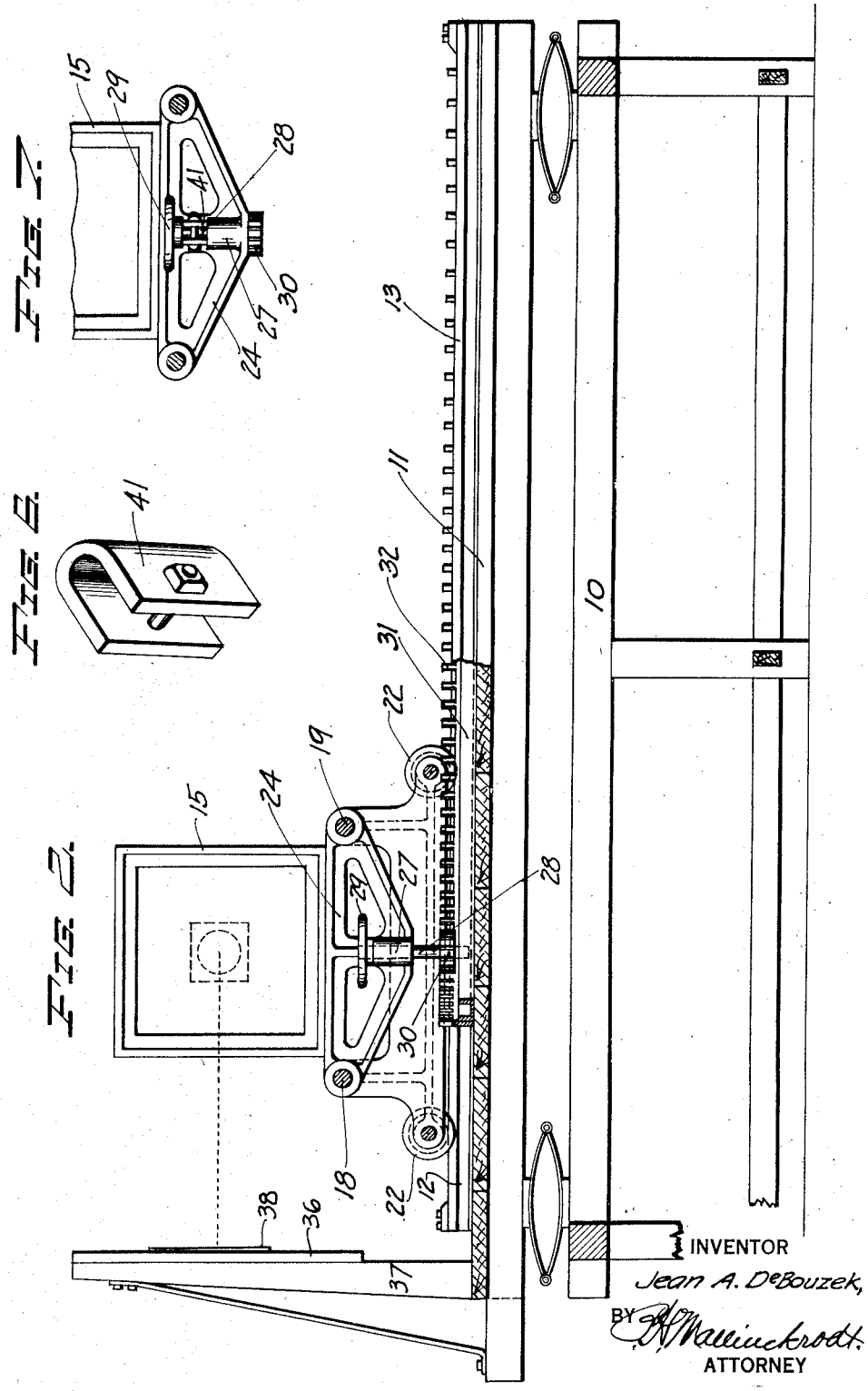

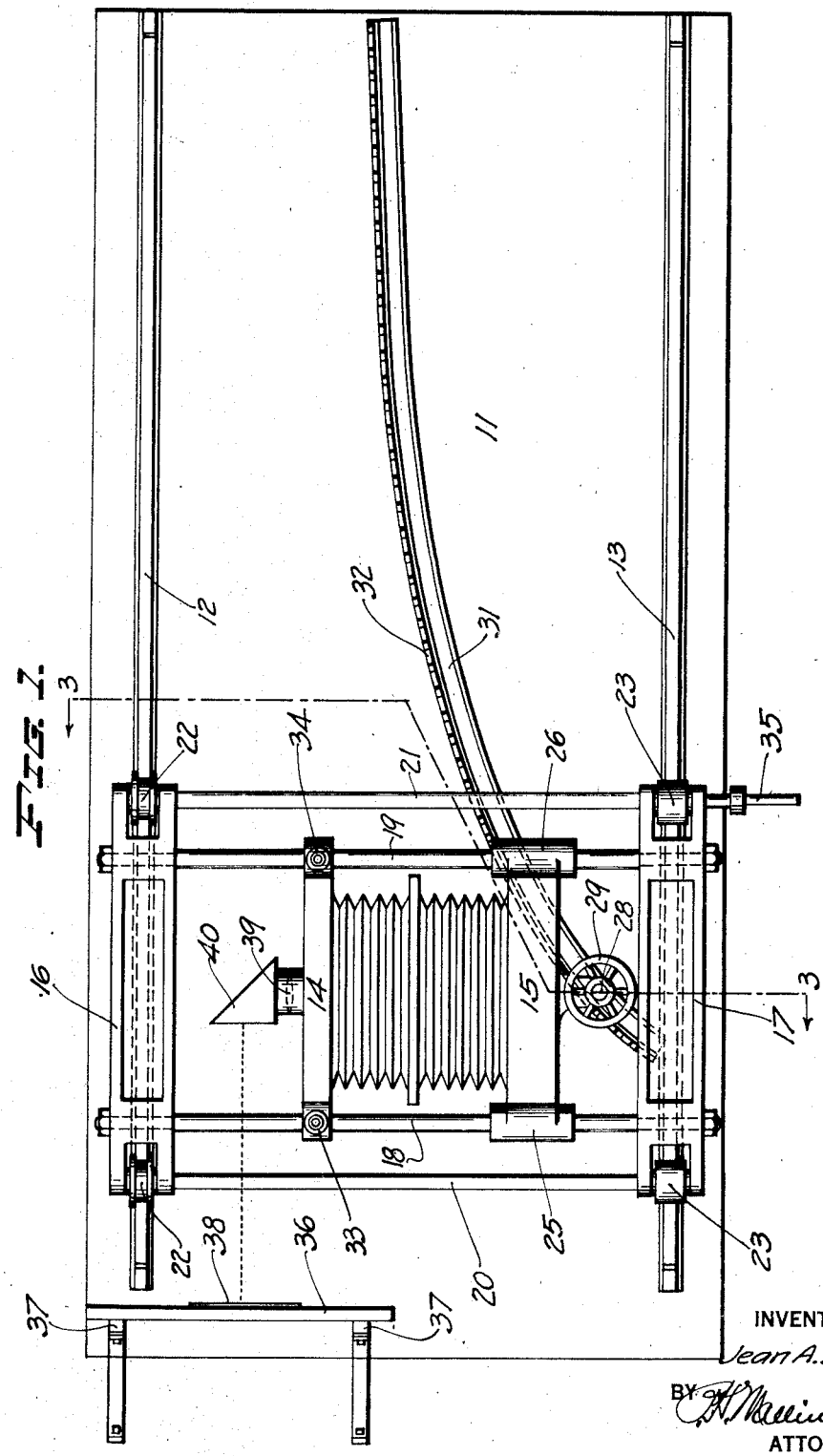

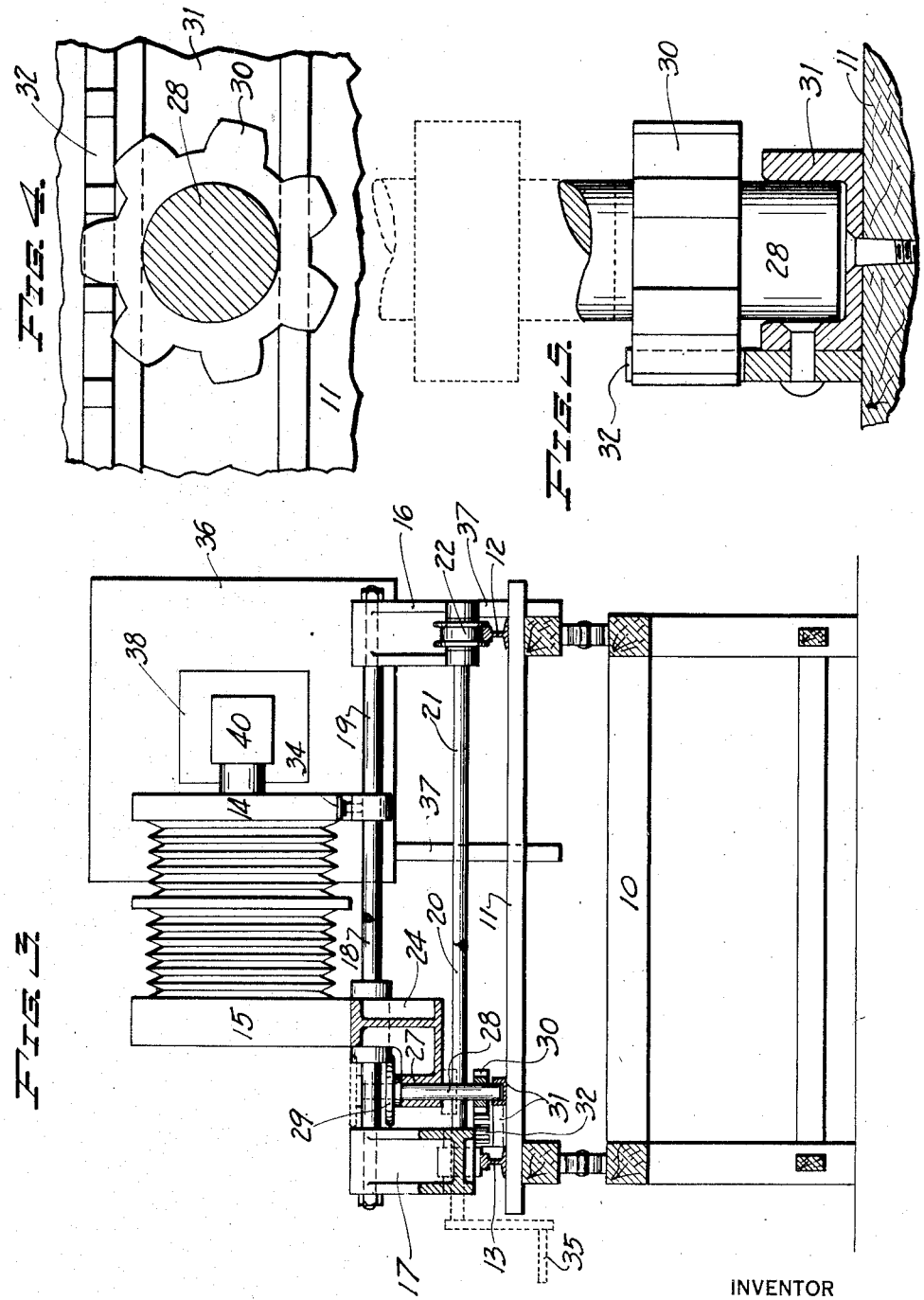

UNITED STATES PATENT OFFICE.

JEAN A. DE BOUZEK, OF SALT LAKE CITY, UTAH.

AUTOMATIC FOCUSING DEVICE FOR CAMERAS.

1,387,457.  Specification of Letters Patent.  Patented Aug. 16, 1921.

Application filed April 26, 1918. Serial No. 230,984.

*To all whom it may concern:*

Be it known that I, JEAN A. DE BOUZEK, a citizen of the United States, and a resident of Salt Lake City, the county of Salt Lake, and the State of Utah, have invented a certain new and useful Automatic Focusing Device for Cameras, of which the following is a specification.

This invention relates to a device for automatically focusing photographic cameras, particularly those cameras which are used in copying and photo-engraving, and its principal objects are:—

1. To simplify the process of focusing the camera, when, at the same time, it is desired to obtain an image of a certain size on the ground glass.
2. To provide a device which shall be simple, efficient and economical.
3. To save a large part of the time usually necessary for adjusting the camera for use.
4. To save the eye-sight and health of the operator.
5. To provide a device which shall have a wide range of usefulness and be adaptable to any conditions usually met with in practice.
6. To reduce the number of operating parts, such as levers, clamps and hand wheels, used for measuring and focusing in photographic cameras.

In attaining the objects mentioned, with the cameras generally used in photo-engraving, and which are so mounted that they may be adjusted longitudinally and transversely in a horizontal plane with relation to the copy, this invention provides a curved guide which engages the movable part or parts of the camera and as the camera is moved along in one direction, a certain predetermined movement of the movable part of the camera with relation with the stationary part, or of the movable parts of the camera with relation to each other, will be automatically effected.

In photo-engraving and copying, the process of bringing the copy into focus and at the same time obtaining an image of any certain size on the ground glass, is a very tedious operation and very trying on the eyes and the health of the operator.

Owing to the fact that when an image of the desired size is obtained on the ground glass, the act of bringing the copy into focus, changes the size of the image on the ground glass, a long continued adjusting back and forth is necessary before an image, approximating the desired size, is obtained, which at the same time will leave the copy exactly in focus.

By the use of this invention, however, it is only necessary to adjust the camera for the desired size of the image, while by the automatic action of the invention, the camera, in each and all of its varying positions, will be perfectly focused.

The features, upon which protection is desired, are collectively grouped in the appended claims.

In the accompanying drawings:

Figure 1 is a plan view of an ordinary camera used in photo-engraving, showing one embodiment of this invention adapted for use therewith.

Fig. 2 is a side elevation partly in section.

Fig. 3 is a transverse vertical section taken on line 3—3 in Fig. 1 and looking in the direction of the arrows.

Figs. 4 and 5 are enlarged fragmentary views, showing minor details.

Fig. 6 is a perspective view of a detailed part and

Fig. 7 is a fragmentary view, showing an alternate position of minor parts.

Throughout the different views, similar parts are designated by similar reference numerals.

Referring to the drawings, 10 represents the framework of a camera stand as generally used, and 11 is the spring-supported platform thereof. On top of the platform are the usual rails 12 and 13.

The camera, consisting of the front body 14 and the back body 15, is mounted on a traveling carriage, made up of the end yokes 16 and 17, and connected at the top by the rods 18 and 19, these rods being adapted at the same time to form guides on which the back body 15 of the camera, may be slidably mounted. The lower parts of the yokes 16 and 17 may be connected by the rods 20 and 21, the latter at the same time forming axles for the carrying wheels or rollers 22 and 23, which are adapted to travel, respectively, on the rails 12 and 13. The back body 15 may be carried on the yoke 24, of which the bearings 25 and 26 may form a part. A bearing 27 may form an integral part of the yoke 24 and be adapted to carry a short shaft 28 on which are rigidly mounted, the hand wheel 29 and the toothed pinion 30.

The shaft 28 projects a short distance below the pinion 30 where it is engaged by a grooved member, or channel 31, formed into a curved track, and a toothed rack 32 is rigidly fastened to the channel 31, all as shown in detail in Figs. 4 and 5. The shaft 28 is so arranged that it may be lifted in its bearing 27 to a height sufficient for its bottom face to clear the rack 32 so that the camera may be used independently of the the track 31 if this should at any time be desired. The lifted position of the shaft 28 and the parts carried by it are shown by dotted lines in Figs. 3 and 5, and in order to support the parts in this position, a U-shaped filler, shown in perspective detail in Fig. 6, may be inserted between the hand-wheel 29 and the bearing 27, as further shown in Fig. 7.

The front body 14, carrying the lens 39 and the prism 40, is normally fixed with relation to the guides 18 and 19 but it may be adjusted on these guides by means of set screws provided with the hand-wheels 33 and 34.

The grooved track 31 is rigidly held in position on the platform 11 by any suitable means. The curvature of the track 31 is determined by the focal length of the particular lens 39 and prism 40 used in the camera, and this curvature will vary with each different lens which may be used, so that the same camera will require a different curved track whenever a different lens is used.

Any points in the curved track, represent positions of the camera in which the object or copy to be photographed are exactly in focus, and the size of the image on the ground glass will vary at each consecutive point in the track, from an image reduced in size when the camera is farthest from the copy to an image enlarged in size when the camera is near the copy.

In order to hold the traveling carriage in a positive position transversely in relation to the track 31, flanges are provided on both sides of the wheels 22, which are accurately fitted to the rail 12, thereby preventing any lateral movement of the wheels.

When it is desired to use the traveling carriage without the automatic focusing device, the shaft 28 may be lifted into its uppermost position while the carriage may be propelled by means of the crank 35, which is mounted on a projecting end of the axle 21. At the same time, the usual means may be employed for actuating the movable body 15 of the camera.

The present drawings show this device adapted for use on a camera provided with a prism but the curved track may be used to equal advantage, with cameras photographing direct.

In operating this device, it is only necessary for the user to bring the shaft 28 into the position where its lower end engages the channel 31 and where the pinion 30 engages the rack 32, then by simply turning the hand-wheel 29 in one direction or the other, the carriage will be moved longitudinally along the platform 11, while at the same time, the movable body 15 of the camera will be caused to move in or out with relation to the fixed front body 14, and for every position which the carriage may assume longitudinally along the platform in relation to the copy, the corresponding position of the ground glass carried in the back body 15 will leave the camera exactly focused.

In the present instance, 36 is the copy board supported on the standards 37, and 38 is the copy mounted on the board 36.

It will be observed that this invention can be carried out practically in a great many different forms, and while an operable combination of parts is shown in the present drawings, the details thereof are not necessarily in the preferred form. It will also be observed that a duplicate track (not shown) could be employed for causing the front body 14 to move simultaneously with regard to the back body 15, in which case, however, the front body 14 would necessarily be free to move on the guides 18 and 19, which would also require a corresponding change of position in the copy 38.

The curved track, etc., can be put into any position vertical, overhead or otherwise, depending upon the kind of structure used for supporting the camera, so that, obviously, this invention can be used to advantage with any modern equipment.

What I claim is:

1. In an automatic focusing device for cameras, the combination with suitably supported rails, of a carriage mounted thereon and adapted to travel back and forth thereover; a camera, having a relatively fixed part and a relatively movable part, mounted on the said carriage; and a suitably curved fixed track adapted to engage the said movable part, whereby the said camera will be kept constantly focused with reference to a fixed copy as the said camera is moved along the said rails toward, or away from, the said copy.

2. In an automatic focusing device for cameras, the combination with a suitable supporting structure having a camera mounted thereon, and adapted to travel across the said structure, of an arm projecting from one part of the camera, a shaft journaled in the said arm, a toothed pinion rigidly mounted on the said shaft, a grooved rail suitably curved and rigidly mounted on the said structure, a toothed, suitably disposed rack portion integral with the grooved rail, the said shaft and toothed pinion being adapted to simultaneously engage respectively the said grooved rail and the said rack portion; and means for rotating the said shaft, all, as and for the purpose specified.

3. An automatic focusing device comprising a traveling member supported on wheels, track members for confining the travel of said wheels to a predetermined path, guide members mounted on the said traveling member, and adapted to support a camera, a stationary guide coördinated to focused positions of the said camera, the said camera having a movable part, and means for causing the movable part of the camera to be actuated by the said stationary guide, as the said traveling member is moved back and forth.

4. An automatic focusing device comprising an object plane, a carriage adapted for movement toward, and away from, the object plane, a camera having a movable part mounted on the said carriage, the optical axis of the camera being transverse to the direction of carriage travel; the said camera further being adapted for focusing on the object plane, and having a prism for reflecting rays of light from the object plane into parallelism with the optical axis of the said camera, a stationary guide for controlling the movable part, and means for operably engaging the said movable part with the said stationary guide, the form of the said guide being determined by a series of rectangular coördinates in pairs, one ordinate of each pair being drawn from the object plane to the intersection of the optical axis of the camera with the receiving face of the said prism, and the other ordinate being drawn from the point of intersection of the first ordinate with the optical axis, to the center of the said engaging means in focused positions of the said camera.

5. The combination with a suitably mounted camera and an object plane on which the said camera may be focused, the said camera being fitted with a prism and adapted to be moved back and forth in the direction of a line passing through the center of the object plane and through the center of the receiving face of the prism, of a guide whose form is determined by a series of Cartesian coördinates whose axes comprise, 1st, a line lying in the plane of the object, and 2nd, a line passing through the object and through the receiving face of the said prism when the camera is in any focused position, and means for causing the said guide to automatically focus the said camera as the camera is moved back and forth.

6. The combination with a suitably mounted camera and an object plane upon which the camera is capable of being focused, the said camera being fitted with a prism and a movable focusing part and being adapted to be moved back and forth in the direction of a line passing through the center of the object plane and through the center of the receiving face of the said prism, of a guide-engaging member projecting from the said movable focusing part, and a guide adapted to be engaged by the said member, the form of the said guide being determined by a series of Cartesian coördinates whose ordinates are the distances from the object plane to the transmitting face of the said prism and whose abscissas are the distances from the transmitting face of the prism to the center of the said guide-engaging member, the camera being in a focused position while determining each pair of the said Cartesian coördinates, all for the purpose of automatically focusing the said camera as the camera is moved back and forth over the said guide.

7. The combination with an object plane and a camera adapted for focusing upon the object plane, the said camera having a movable part, of a carriage for supporting the said camera, a structure having a pathway on which the said carriage is adapted to travel forth and back transversely to the optical axis of the camera, and a guide member for automatically controlling the focusing movements of the camera as the said carriage moves along the said pathway.

8. A camera having a movable part, an object plane upon which said camera may be focused, a carriage for supporting the said camera, a supporting structure having track members on which the said carriage may be reciprocated transversely to the optical axis of the said camera along a predetermined path, a guide member whose form is determined by an axis of ordinates and an axis of abscissas, one of the axes being parallel to the focusing travel of the said movable part relatively to the carriage, and the other axis being parallel to the direction of travel of the said carriage, while the ordinates and abscissas are determined by a point of the said movable part in different focused positions of the said camera.

In testimony that I claim this invention as my own I affix my signature hereto in the presence of two subscribing witnesses.

J. A. DE BOUZEK.

Witnesses:
CORNELIUS SALISBURY,
P. H. MALLINCKRODT.